(12) United States Patent
Robin et al.

(10) Patent No.: US 11,254,506 B1
(45) Date of Patent: Feb. 22, 2022

(54) MULTI-STORY ROBOTIC DRIVE PACKAGE SORTATION

(71) Applicant: Amazon Technologies, Inc., Seattle, WA (US)

(72) Inventors: Stephane Robin, Stoneham, MA (US); Abraham Cantwell, Boston, MA (US); Andrew Tinka, Seattle, WA (US); Keith Richardson, Londonderry, NH (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 16/711,013

(22) Filed: Dec. 11, 2019

(51) Int. Cl.
| | | |
|---|---|---|
| B65G 11/02 | (2006.01) | |
| B07C 3/00 | (2006.01) | |
| B66F 9/06 | (2006.01) | |
| B65G 1/06 | (2006.01) | |
| G05B 19/418 | (2006.01) | |
| B65G 1/137 | (2006.01) | |
| B25J 5/02 | (2006.01) | |
| B07C 3/08 | (2006.01) | |
| B07C 3/18 | (2006.01) | |

(52) U.S. Cl.
CPC ............ B65G 11/023 (2013.01); B07C 3/005 (2013.01); B07C 3/008 (2013.01); B07C 3/082 (2013.01); B07C 3/18 (2013.01); B25J 5/02 (2013.01); B65G 1/065 (2013.01); B65G 1/1378 (2013.01); B66F 9/063 (2013.01); G05B 19/41895 (2013.01); B65G 2201/02 (2013.01)

(58) Field of Classification Search
CPC .............................. B65G 11/023; B65G 11/04
USPC ........................................ 193/8, 14, 23, 25 A
See application file for complete search history.

(56) References Cited

U.S. PATENT DOCUMENTS

| | | | | |
|---|---|---|---|---|
| 961,340 | A * | 6/1910 | Cormack ............. | B65G 11/023 193/12 |
| 6,276,507 | B1 * | 8/2001 | Smedlund ............. | B65F 1/0093 193/23 |
| 2003/0038065 | A1 * | 2/2003 | Pippin .................... | B65H 29/14 209/584 |
| 2016/0097206 | A1 * | 4/2016 | Embley .................. | E04F 17/12 193/34 |
| 2017/0174432 | A1 * | 6/2017 | Zhu .................. | G05B 19/41895 |
| 2019/0389672 | A1 * | 12/2019 | Zhang ....................... | B07C 3/00 |
| 2020/0078828 | A1 * | 3/2020 | Futch ......................... | B07C 3/10 |
| 2020/0146489 | A1 * | 5/2020 | Orton ..................... | A47G 29/20 |
| 2020/0407178 | A1 * | 12/2020 | Battles ............... | G06Q 30/0635 |

* cited by examiner

*Primary Examiner* — Thomas Randazzo
(74) *Attorney, Agent, or Firm* — Lee & Hayes, P.C.

(57) ABSTRACT

Within a sortation center, robotic drives may coordinate to sort packages. In some instances, first robotic drives on a third floor may deposit packages into first chutes that transfer the packages to a second floor. Awaiting second robotic drives on the second floor may receive the packages and may deposit the packages into second chutes that transfer the packages to a first floor. At the first floor, the packages may arrive into a container associated with shipping the packages. Depositing the packages in the first chutes may align the packages with a respective container on the first floor in a first direction and depositing the packages in the second chutes may align the packages with their respective container on the second floor in a second direction.

20 Claims, 8 Drawing Sheets

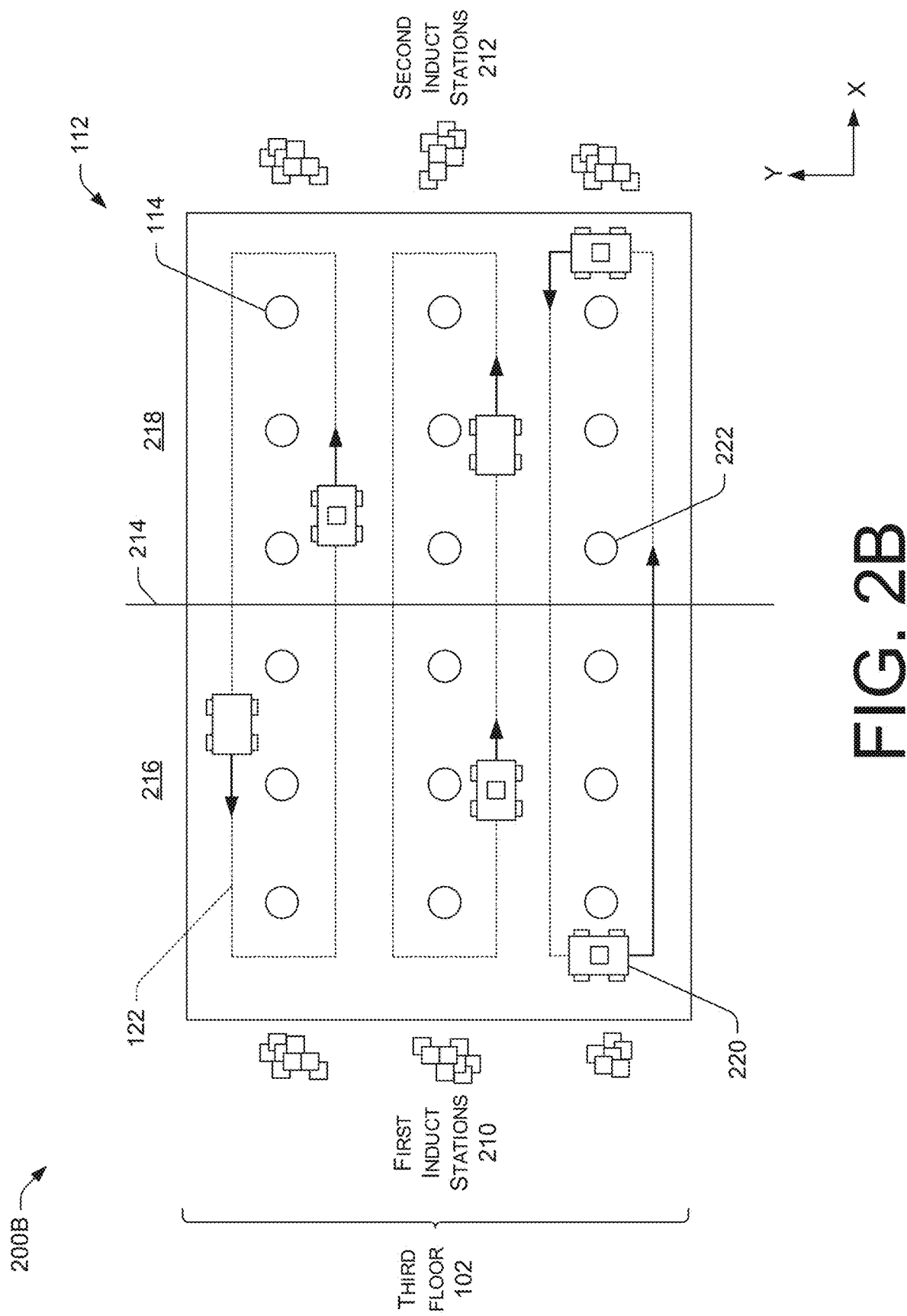

MULTI-STORY ROBOTIC DRIVE PACKAGE SORTATION

CROSS-REFERENCE TO RELATED APPLICATIONS

This application, incorporates by reference, in its entirety, U.S. application Ser. No. 15/934,251, entitled "Mobile Drive Unit Having a Conveyor Module."

BACKGROUND

The development of e-commerce has brought about an increase in order fulfillment, shipping, and distribution. To handle this increase, carriers or retailers often employ systems of conveyor belts and/or robots. For example, retailers may utilize conveyors to transfer packages between locations within warehouses. Additionally, robots may navigate around warehouses to transfer packages into bins for shipment. In these environments, however, the use of robots may lead to congestion. For example, as warehouses may employ a plurality of robotic drives, the warehouse may become congested and robotic drives may take increased time and computational resources to sort, transport, and deliver packages.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 2B illustrates an example environment for sorting packages using robotic drives, according to an embodiment of the present disclosure. In some instances, one or more floors of the environment may include first robotic drives that sort packages in a first direction and which receive packages from one or more induct stations, while one or more additional floors may include second robotic drives that sort packages in a second, different direction.

DETAILED DESCRIPTION

Figure 1:
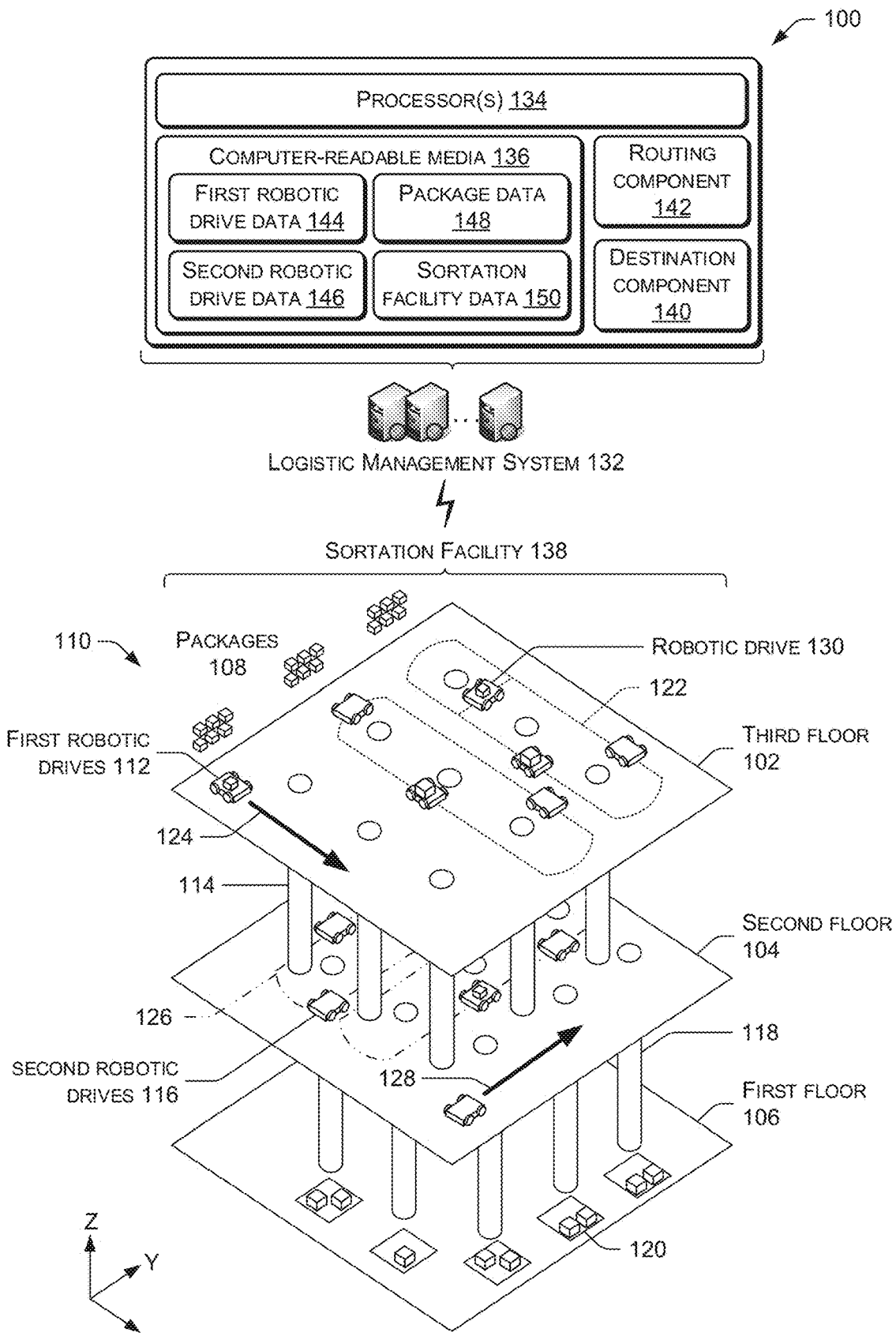
FIG. 1 illustrates an example environment for sorting packages using robotic drives, according to an embodiment of the present disclosure. In some instances, the environment may include a sortation facility in which packages are sorted for delivery. The robotic drives may coordinate to transfer packages between floors and deliver the packages to a container.

Discussed herein are systems and methods for sorting packages within an environment. In some instances, the systems and methods may be implemented or find use in a sortation center associated with sorting, inducting, and/or distributing packages. In some instances, the sortation center may include multiple levels, stories, or floors as well as slides, ramps, conveyors, elevators, or chutes to transfer packages between floors. Robotic drives or other automated machines may transfer packages from induct station(s) to a collection site associated with a destination of the package. During this process, the robotic drives may deliver the packages to the chutes and awaiting robotic drives may receive the packages. Therein, the robotic drives to which the packages are transferred may deliver the packages to other chutes for depositing the packages into containers. Depending on the destination of the packages, the robotic drives may deposit the packages into specific chutes within the sortation center. As the containers become full (e.g., a threshold weight, a threshold volume, a threshold number of items/packages, etc.), the containers may be readied for shipment to their associated destination.

In some instances, the sortation center may include robotic drives located on different floors and which sort packages in different directions. For example, in some instances, the sortation center may include three floors. On a top, or third floor, packages may be readied for shipment or sortation. For example, orders may be processed and fulfilled by a retailer, e-commerce merchant, distributor, supplier, or other provider. Personnel may locate or pick item(s) by pulling the item(s) off shelves, out of bins, etc. The items may then travel, whether by a conveyor system or by personnel, to a packaging station where the items are packaged into packages (e.g., boxes, bags, envelopes, etc.). In some instances, portions of this process may be performed by automated machines (e.g., robots) that locate the item(s), pick the items, and/or package the item(s). After packaging, the packages may move through multiple follow-on processes at the same facility, or at additional facilities, to arrive at the third floor (e.g., conveyors). In some instances, the order may be processed and fulfilled at a location or environment separate from the sortation center and then transported or otherwise delivered to the sortation center. However, in some instances, the orders may be processed, fulfilled, and sorted within the same environment, or different locations within the same environment. Regardless, after arriving at the third floor, packages may be processed at induct stations.

At the induct stations, personnel or automated machines may place the packages onto first robotic drives. For example, the first robotic drives may include a compartment, container, holder, receptacle, or platform for receiving the packages. The first robotic drives may travel to first chutes that span between the third floor and a middle floor, or second floor. Upon arriving at the first chutes, the first robotic drives may deposit the packages into the first chutes. For example, the first robotic drives may include an arm, lift, or tilt mechanism that transfers the package into the first chutes. In some instances, the first chutes may include bumpers, cushions, and/or other features that control a rate at which the packages descend between the third floor and the second floor or how the packages descend through the first chutes.

On the second floor, second robotic drives may await the packages beneath the first chutes. The second robotic drives, for instance, may include a compartment, container, receptacle, or platform for receiving packages. Additionally, in some instances, the first chutes (or other equipment on the second floor) may include lift mechanisms that place the packages into and/or onto the second robotic drives. After receiving the packages, the second robotic drives may travel to second slides, ramps, or chutes that span between the second floor and a bottom floor, or first floor. Upon arriving at the second chutes, the second robotic drives may deposit the packages into the second chutes. For example, the second robotic drives may include an arm, lift, or tilt mechanism that transfers the package into the second chutes. In some instances, the second chutes may include bumpers, cushions, and/or other features that control a rate at which the packages descend between the second floor and the first floor or how the packages descend through the second chutes.

On the first floor, containers such as bins, gaylords, crates, pallets, and so forth may reside underneath the second chutes and receive the packages from the second robotic drives. In some instances, the second chutes (or other equipment on the first floor) may include lift mechanisms that place the packages into the containers. Over time, as the containers may become full, the containers may be readied for shipment. For example, the containers may be replaced with empty containers for receiving additional packages.

Each of the containers on the first floor may be associated with a destination address, location, and/or area. For example, knowing which containers are associated with the destination of the packages, the first robotic drives and the second robotic drives may cooperatively operate to transfer the packages into their respective containers. That is, the first robotic drives may transfer the packages into the first chutes, onto the second robotic drives, and therein, the second robotic drives may transfer the packages to the second chutes for emptying into the containers.

In some instances, the first robotic drives may travel primarily in a first direction or within/along a first axis within the sortation center, while the second robotic drives may travel primarily in a second direction or within/along a second axis within the sortation center. In some instances, the first direction may be substantially perpendicular to the second direction. For example, within the sortation center, the first robotic drives may travel primarily in an X-direction, while the second robotic drives may travel primarily in a Y-direction. The first chutes and the second chutes span between the floors, in (or approximately in) the Z-direction. In this sense, the sortation center may correspond to a grid system for sorting packages.

Separating the first robotic drives and the second robotic drives on different floors, and their respective directions of travel, may reduce a congestion within the sortation center, thereby leading to an increase in package sortation. For example, separating the directions of travel to different floors may avoid robotic drives crisscrossing one another within the sortation center. Conventionally, this crisscrossing often leads to robotic drive damage and/or reduced package sortation. That is, as the robotic drives may have to circumnavigate one another or await other robotic drives to move out of the way, the robotic drives may have continuously move around other robotic drives. This circumnavigation increases the distance traveled by the robotic drives, as well as increases battery usage of the robotic drives, and hence reduces the amount of time the robotic drives are sorting packages. Instead, placing the first robotic drives and the second robotic drives on different floors may reduce congestion within the sortation center. That is, as the first robotic drives on the third floor travel primarily in the first direction, the first robotic drives may avoid crisscrossing with other first robotic drives and/or the second robotic drives. Similarly, as the second robotic drives on the second floor travel primarily in the second direction, the second robotic drives may avoid crisscrossing with other second robotic drives and/or the first robotic drives. Additionally, the first robotic drives and/or the second robotic drives may travel in elongated loops on the third floor and the second floor, respectively. The elongated loops, as well as the similar direction of travel of the first robotic drives and the second robotic drives on their respective floors, may result in a flow of traffic that does not cross or intersect.

By way of example, a package destined for Houston, Tex. may be inducted onto a first robotic drive on the third floor. The first robotic drive may travel in a first direction to a first chute that spans between the third floor and the second floor. At the first chute, the first robotic drive may deposit the package into the first chute. An awaiting second robotic drive on the second floor may receive the package via the first chute and travel in a second direction to a second chute, which is associated with packages destined for Houston, Tex. or to be shipped to Houston, Tex. The second robotic drive may deposit the package into the second chute to an awaiting container on the first floor, and which is positioned under (e.g., vertically beneath) the second chute. As such, the first robotic drive and the second robotic drive may operatively, and collectively, function to transfer the package from the induct station to the appropriate container.

The sortation center may maintain a fleet of first robotic drives on the third floor and which are configured to deposit the packages into the first chutes. Similarly, the sortation center may maintain a fleet of second robotic drives on the second floor and which are configured to deposit the packages into the second chutes. Regardless of where the packages are inducted on the third floor, the packages may be deposited into their respective container on the first floor. That is, the first robotic drives and the second robotic drives may coordinate to collectively deposit the package into the corresponding container on the first floor. For example, the third floor may include multiple rows of first chutes that are spaced apart and the second floor may include multiple rows of second chutes that are spaced apart. On the third floor, the first robotic drives may deposit the packages into chutes that align, in a first direction, with a container into which the package is to ultimately be placed on the first floor. On the second floor, the second robotic drives may deposit the packages into chutes that align, in a second direction, with the container. In this sense, the second chutes may be disposed vertically above the container into which the packages are to be deposited. Accordingly, via the first chutes and the second chutes, the first robotic drives and the second robotic drives may deposit the packages into their respective containers on the first floor.

In some instances, the sortation of the packages within the sortation center may be controlled or management by a centralized or logistic management system. In some embodiments, the logistic management system may receive, from customer devices of customers, orders for items and then subsequently fulfill those orders, which may include causing the items to be packaged for transport and delivery to delivery destinations of customers within sortation centers or facilities. The logistic management system may coordinate the induction of the packages as well as which chutes the first robotic drives and the second robotic drives deposit the packages. For example, coordinating the transfer of a package from the third floor to the first floor may involve multiple operations, or deliveries. The logistic management system may first determine a destination address or location of the package. Second, based on the destination location, the logistic management system may instruct a first robotic drive on the third floor to perform a first delivery associated with depositing the package into a first chute for transferring the package to the second floor. The first chute may be chosen to align the package, in a first direction, with a target container on the first floor that is associated with the destination location. The logistic management system may also instruct a second robotic drive on the second floor to position beneath the first chute. In some instances, as part of this process, the logistic management system may transmit an acknowledgement to the first robotic drive indicating that the second robotic drive is positioned beneath the first chute. This way the second robotic drive may be in position to receive the package. After the second robotic drive receives the package the logistic management system may instruct the second robotic to perform a second delivery associated with depositing the package into a second chute for transferring the package to the first floor and into the container. The second chute may correspond with the destination location of the package, and in this sense, the second robotic drive may align, in a second direction, the package with the container (e.g., the second chute is disposed vertically above the container).

The logistic management system may maintain or otherwise control the operation of the first robotic drives and/or the second robotic drives. Here, for example, within the sortation center, the first robotic drives and the second robotic drives may continuously receive instructions from the logistic management system regarding chutes the first robotic drives and the second robotic drives are to deposit packages, respectively. Here, the logistic management system may receive indications associated with the locations of the first robotic drives and the second robotic drives to instruct the first robotic drives and the second robotic drives as to which chutes to deposit the packages.

In light of the above, this application discusses a system or network of first robotic drives and second robotic drives, spread across multiple floors, that function to increase package throughput and sortation. The first robotic drives sort packages in a first direction depending on the destination address of the packages. Upon transferring the packages to second robotic drives, via the first chutes, the second robotic drives may sort the packages in a second direction depending on the destination address of the packages. Separating the first robotic drives and the second robotic drives on different floors, may in some instances, maximize space usable by the first robotic drives and/or the second robotic drives, minimize a driving distance of the first robotic drives and/or the second robotic drives, and/or minimize crisscrossing of robotic drives. That is, as the first robotic drives and the second robotic drives include different directions of travel (or sortation), organizing the first robotic drives and the second robotic drives on different floors may reduce the crisscrossing of robotic drives when delivering and/or sorting packages. The systems and methods discussed herein may also dynamically scale on an as needed basis to handle increased and/or decreased sortation.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1. illustrates an example environment 100 according embodiments of the present disclosure. In some instances, the environment 100 may correspond to a sortation center in which packages are sorted or categorized for shipment. In some instances, the environment 100 may represent induction centers, air gateways, air hubs, delivery centers, cross-docking centers, distribution centers, handling facilities, processing facilities, or other environments in which packages are sorted for delivery and/or distribution across multiple locations.

In some instances, the environment 100 may additionally or alternatively represent facilities or centers in which orders are fulfilled, packaged, and/or shipped. For example, the environment 100 may include inventory (e.g., clothing, electronics, toys, household goods, etc.) stored in bins, slots, shelves, containers, crates, stalls, racks, etc. As orders are placed, personnel and/or robots may locate and pick the items from the inventory.

As shown, the environment 100 may include multiple floors, such as a third (or top) floor 102, a second (or middle) floor 104, and a first (or bottom) floor 106. Discussed herein, chutes may transfer packages 108 between the floors of the environment 100 for sorting the packages 108 based on an intended destination of the packages 108. For example, after the packages 108 arrive within the environment 100, or after orders are packaged, the packages 108 may arrive at induct stations 110 on the third floor 102. In instances where the environment 100 includes inventory, packaging stations at which the items are placed into boxes, envelopes, bags, or other parcels for shipment may be located adjacent to the induct stations 110. Alternatively, in some instances, the induct stations 110 may include or represent the packaging stations where the orders are packed for shipment. Still, the packages 108 may be packaged at different locations (e.g., same floor, different floor, etc.) within the environment 100 and may travel to the induct stations 110 on the third floor 102 via conveyors, chutes, autonomous vehicles, etc.

At the induct stations 110 the packages 108 may be placed onto robots, moveable robotic drives, or other robotic drives or devices for sortation within the environment 100. For example, the environment 100 may include a plurality of first robotic drives 112 for transporting and sorting the packages 108 within the environment 100 (singularly referred to herein as "the first robotic drive 112"). In some instances, the first robotic drives 112 may include baskets, bins, and/or other compartments for receiving the packages 108.

In some instances, the induct stations 110 may include manual induct stations and/or automated induct stations whereby the packages 108 are placed onto the first robotic drives 112. For example, personnel may manually place the packages 108 onto the first robotic drives 112 and/or robots may autonomously place the packages 108 onto the first robotic drives 112. In some instances, the induct stations 110 may include any number of separate, discrete, or individual induct stations to induct the packages 108. In some instances, the first robotic drives 112 may be pre-staged (e.g., queued) next to the induct stations 110 for receiving the packages 108. Additionally, although the induct stations 110 are shown being located at a particularly area, side, or end of the third floor 102, the third floor 102 may include induct stations 110 located at different locations and/or more induct stations 110 than shown. For example, induct stations 110 may located on opposing ends or sides of the third floor 102 and the first robotic drives 112 may be configured to receive the packages from the one or more induct stations 110.

After receiving the packages 108, the first robotic drives 112 may transport the packages 108 to first chutes 114. For example, the first robotic drives 112 may include a drive unit or mechanism (e.g., wheels, tracks, etc.) for transporting the packages 108 on the third floor 102. In some instances, the drive unit or mechanism may resemble those as discussed and illustrated in U.S. application Ser. No. 15/934,251. The first chutes 114 may extend between the third floor 102 and the second floor 104 for transferring the packages 108 from the third floor 102 to the second floor 104. The first chutes 114 may include or represent funnels, conduits, slides, or other mechanisms for controlling at rate at which the packages 108 descent to the second floor 104. Such mechanisms may prevent damage to the packages 108, or their contents, as well as position or place the packages 108 on second robotic drives 116, as discussed herein.

In some instances, on the third floor 102, the first robotic drives 112 may position next to the first chutes 114 for transferring the packages 108 or depositing the packages 108 into the first chutes 114. For example, the first robotic drives 112 may include a lift, tilt mechanism, or arm that places or otherwise transfers the packages 108 into the first chutes 114. After transferring the packages 108, the first robotic drive 112 may return to the induct stations 110 (or other induct stations on the third floor 102) to receive additional packages 108 for transferring to the first chutes 114.

The second floor 104 may include the second robotic drives 116 that receive the packages 108 from the first chutes 114. For example, the second robotic drives 116 may position beneath the first chutes 114 and receive the packages 108 from the first robotic drives 112 as the first robotic drives 112 deposit the packages 108 into the first chutes 114.

In some instances, the second robotic drives 116 may include baskets, bins, and/or other compartments for receiving the packages 108. After receiving the packages 108, the second robotic drives 116 may transport the packages 108 to second chutes 118. For example, the second robotic drives 116 may include a drive unit or mechanism (e.g., wheels, tracks, etc.) for transporting the packages 108 on the second floor 104. In some instances, the drive unit or mechanism may resemble those as discussed and illustrated in U.S. application Ser. No. 15/934,251. The second chutes 118 may extend between the second floor 104 and the first floor 106 for transferring the packages 108 from the second floor 104 to the first floor 106. The second chutes 118 may include funnels, conduits, slides, or other mechanisms for controlling at rate at which the packages 108 descend from the second floor 104 to the first floor 106.

In some instances, on the second floor 104, the second robotic drives 116 may position next to the second chutes 118 for transferring the packages 108 to the first floor 106. For example, the second robotic drives 116 may include a lift, tilt mechanism, or arm that places or otherwise transfers the packages 108 into the second chutes 118. After transferring the packages 108, the second robotic drives 116 may travel to other first chutes 114 to receive additional packages 108.

On the first floor 106, containers 120 may receive the packages 108 from the second chutes 118. In some instances, the containers 120 may include bags, cartons, pallets, crates, gaylords, and so forth into which the packages 108 are placed. In some instances, the containers 120 may be located on a moveable or robotic device (e.g., third robotic drives). As the containers 120 become full, the robotic device may move the containers 120 to an ejection site whereby the container 120 (and the packages 108) may be readied for shipment. For example, the containers 120 may include sensors to determine whether the containers 120 are full (e.g., threshold weight, threshold volume, threshold number of items/packages, etc.) and the robotic drives may deliver the containers 120 to the ejection sites, which in some instances, may be located on a periphery or perimeter of the environment 100. In some instances, the environment 100 may include sensors that determine when the containers 120 become full or otherwise need to be dropped off.

At the ejection site, the containers 120 may be dropped off for shipping to the destination address. In some instances, the containers 120 may be dropped off onto multiple shipping platforms (e.g., pallet, delivery truck, delivery trailer, etc.). The robotic drives transporting the containers 120 may then pick up another container 120 for receiving additional packages and return to a position on the first floor 106 for receiving additional packages 108. In some instances, an additional robotic device may replace a previously vacated location beneath the second chutes 118 to avoid vacancies beneath the second chutes 118. In this sense, the robotic drives may either statically map to certain locations on the first floor 106 (e.g., the robotic drive may return to a previously assigned location on the first floor) and/or the robotic drive may travel to or be assigned a new location on the first floor 106. In some instances, the robotic drives may travel to other locations on the first floor 106 (e.g., holding area, maintenance bay, charging station, etc.).

Noted above, the containers 120 on the first floor 106 may each be associated with a destination address. Additionally, or alternatively, the containers 120 may be associated with multiple destination addresses to permit downstream sortation of the packages 108 at subsequent facilities. By assigning destination addresses to the containers 120, packages destined to the same or geographically proximate addresses may be placed or grouped into the containers 120. By way of example, containers 120 may be assigned to Jacksonville, Fla., Seattle, Wash., and Syracuse, N.Y.

In some instances, the containers 120 may be organized on the first floor 106 based on a number or volume of packages received. For example, the containers 120 associated with a high-volume destination addresses (or high package throughput) may be located close to the induct stations 110 to reduce an amount of travel for the first robotic drives 112 and/or the second robotic drives 116. Additionally, or alternatively, the containers 120 associated with high-volume destination addresses may be separated or spaced apart from one another to reduce a congestion of the first robotic drives 112 at the first chutes 114 and/or the second robotic drives 116 at the first chutes 114 and/or the second chutes 118. For example, the containers 120 associated with New York City and Chicago, or chutes corresponding to these locations, may be spaced apart within the environment 100.

The first robotic drives 112 and/or the second robotic drives 116 may utilize aisles, pathways, or lanes for delivering the packages 108. For example, on the third floor 102, the first robotic drives 112 may travel in first lanes 122 between adjacent rows of the first chutes 114. As shown, in some instances, the first lanes 122 may be oriented in a first direction 124 (or along a first axis). In some instances, the first lanes 122 may resemble loops in the first direction 124 and the first robotic drives 112 may travel in the first lanes 122 in the same direction (e.g., clockwise or counterclockwise). With reference to the Cartesian Coordinate System, in some instances, the first direction 124 may correspond to the X-direction.

Similarly, on the second floor 104, the second robotic drives 116 may travel in second lanes 126 between adjacent rows of the second chutes 118. As shown, in some instances, the second lanes 126 may be oriented in a second direction 128 (or along a second axis). In some instances, the second lanes 126 may resemble loops in the second direction 128 and the second robotic drives 116 may travel in the second lanes 126 in the same direction (e.g., clockwise or counterclockwise). With reference to the Cartesian Coordinate System, in some instances, the second direction 128 may correspond to the Y-direction. In some instances, the first direction 124 may be substantially perpendicular to the second direction 128.

However, although discussed and/or described at loops, the first lanes 122 and/or the second lanes 124 may include or resemble paths or tracks of any shape, size, length, etc. As discussed above, the third floor 102 may include any number of induct stations 110 at which the first robotic drives 112 receive the packages 108. In some instances, induct stations 110 may be located on opposing ends of the first lanes 122. In such instances, the first robotic drives 116 may receive the packages 108 at either of the induct stations 110 depending on the location of the first chutes 114 the first robotic drives 112 transfer the packages 108. In this sense, depending on the location of the first robotic drives 112 within the first loops 122, or on the third floor 102, the first robotic drives 112 may receive packages from one or more induct stations 110.

In some instances, the first robotic drives 112 and/or the second robotic drives 116 may utilize markers (e.g., infrared markers, QR codes, barcodes, identifiers, etc.) on the third floor 102 and the second floor 104, respectively, for navigating within the environment 100. For example, the markers may be placed on the third floor 102 for use by the first robotic drives 112 to navigate to the first chutes 114, along or within the first lanes 122, and/or to the induct stations 110. The first robotic drives 112 may include a capturing device (e.g., scanner, camera, etc.) that images the markers to determine a current location and/or a path to the induct stations 110 and/or the first chutes 114. The second robotic drives 116 may similarly utilize markers placed on the second floor 104 for navigating to the first chutes 114, the second chutes 118, and/or along or within the second lanes 126.

Additionally, or alternatively, lights may be projected onto the third floor 102 and/or the second floor 104, respectively, for use by the first robotic drives 112 and/or the second robotic drives 116 for traveling within the environment 100. However, in some instances, the first robotic drives 112 and/or the second robotic drives 116 may travel within the environment 100 without utilizing the markers and/or imaging the markers.

As shown in FIG. 1, in some instances, the first lanes 122 and the second lanes 126 may extend primarily in respective directions within the environment 100. For example, discussed above, the first lanes 122 may primarily extend in the X-direction (or along the X-axis) while the second lanes 126 may primary extend in the Y-direction (or along the Y-axis). As shown, the first lanes 122 may encircle or loop around rows of the first chutes 114, while the second lanes 126 may encircle or loop around rows of the second chutes 118. In some instances, the rows of the first chutes 114 may be spaced apart and extend in the Y-direction, where the individual first chutes 114, within the individual rows of the first chutes 114, are spaced apart and extend in the X-direction. Similarly, in some instances, the rows of the second chutes 118 may be spaced apart and extend in the X-direction, where the individual second chutes 118, within the individual rows of the second chutes 118, are spaced apart and extend in the Y-direction.

When delivering the packages 108 to the first chutes 114 and the second chutes 118, respectively, the first robotic drives 112 and the second robotic drives 116 may travel in the first lanes 122 and the second lanes 126, respectively. For example, in delivering a package to a first chute among the first chutes 114, a first robotic drive of the first robotic drives 112 may travel within a first lane of the first lanes 122. The first robotic drive may stop at the first chute, within the first lane, and deposit the package into the first chute. Therein, the first robotic drive may continue down the first lane to the induct station(s) corresponding to the row of first chutes 114 to receive another package. Within the first lane, however, and while the first robotic drive is depositing the package into the first chute, the first robotic drive may obstruct other first robotic drives 112 traveling within the first lane (for delivering packages to the first chutes 114 within the first lane). In some instances, to prevent such occurrences, the first robotic drives 112 may traverse or navigate between the first chutes 114 to pull off the first lanes 122 and avoid congestion within the first lanes 122. For example, FIG. 1 illustrates a robotic drive 130 navigating within a space between the first chutes 114. Here, the robotic drive 130 may travel along a first lane of the first lanes 122, and once adjacent to the first chute corresponding to the drop off location of the package, may navigate into the space between the first chutes 114. In such instances, the robotic drive 130 may arrive at the first chute and deposit the package before turning back onto the first lane and picking up another package. In such instances, the robotic drive 130 may bypass traveling along an entire distance of the first lane, but rather, may traverse between the first chutes 114. That is, the first robotic drives 112 may, in some instances, travel in the Y-direction for navigating to another side of the first lanes 122, or another portion of the first lanes 122. Such a maneuver may reduce a distance traveled by the first robotic drives 112 and may lead to an increase in package sortation and delivery, as well as reduced battery usage by the first robotic drives 112. The first robotic drives 112 may communicate with one another or have sensors to prevent collision between one another while traveling along the first lanes 122 and/or resuming travel along the first lanes 122. However, despite traveling in the Y-direction, the first robotic drives 112 may be configured to sort the packages 108 in the first direction 124 (or axis) within the environment 100.

The second robotic drives 116 may additionally, or alternatively, navigate between spaces within the second lanes 126 for depositing the packages 108 into the second chutes 118. Herein, the second robotic drives 116 may, in some instances, be configured to travel in the X-direction between opposing sides of the second lanes 126 to reduce a distance traveled by the second robotic drives 116. The second robotic drives 116 may communicate with one another or have sensors to prevent collision between one another while traveling along the second lanes 126 and/or resuming travel along the second lanes 126. However, despite traveling in the X-direction, between opposing sides of the second lanes 126, the second robotic drives 116 may be configured to sort the packages 108 in the second direction 12 (or axis) within the environment 100.

In some instances, the environment 100 may include a logistic management system 132 for managing and coordinating the sorting of the packages 108. In some instances, the logistic management system 132 may be located within the environment 100 (or the sortation facility 138) and/or external from the environment 100 (or the sortation facility 138). As shown, the logistic management system 132 may include processor(s) 134 for performing various functions or operations associated with sorting the packages 108 and computer-readable media 136 for storing instructions executable by the processor(s) 134. For example, the logistic management system 132 may transmit instructions to the first robotic drives 112 and/or the second robotic drives 116 regarding which chutes (i.e., the first chutes 114 and the second chutes 118, respectively) the packages 108 are to be deposited. Upon receiving the instructions, the first robotic drives 112 and the second robotic drives 116 may travel to the chutes and deposit the packages 108.

For example, the logistic management system 132 may determine the destination address of the packages 108 via the package data 148. Knowing the destination address, the logistic management system 132 may determine a first chute among the first chutes 114 which a first robotic drive of the first robotic drives 112 is to deposit a package. The first chute may align the package, in a first direction or along a first axis (e.g., X-direction or X-axis), with a particular container on the first floor 106 associated with the destination address of the package. The logistic management system 132 may therein transmit an indication to the first robotic drive of the first chute and which the first robotic drive is to deliver the package. The first robotic drive may then travel from the induct station to the first chute, and upon arriving at the first chute, may transfer the package to the first chute (e.g., using an arm mechanism). After transferring the package, the first robotic drive to return to the induct station and/or the logistic management system 132 may instruct the first robotic drive to return to the induct station.

Meanwhile, a second robotic drive among the second robotic drives 116 may receive the package from the first chute. For example, the logistic management system 132 may transmit an instruction to the second robotic drive to position beneath the first chute to receive the package. In some instances, prior to the first robotic drive depositing the package into the first chute, the logistic management system 132 may determine that the second robotic drive is in position to receive the package from the first chute. In some instances, the logistic management system 132 may receive a confirmation from the second robotic drive indicating that the second robotic drive is positioned beneath the first chute. The logistic management system 132 may also otherwise determine that the second robotic drive is in place to receive the package (e.g., via sensors in the environment 100, location component of the second robotic drive, etc.). The logistic management system 132 may therein instruct the first robotic drive to deposit the package into the first chute.

Before, during, or after receiving the package via the first chute, the logistic management system 132 may transmit an instruction to the second robotic drive regarding a second chute among the second chutes 118 that the second robotic drive is to transfer the package. The second chute may align the package, in a second direction or along a second axis (e.g., Y-direction or Y-axis), with the particular container on the first floor 106 associated with the destination address of the package. Accordingly, the second robotic drive may then travel from the first chute to the second chute, and upon arriving at the second chute, may transfer the package to the second chute (e.g., using an arm mechanism). After transferring the package, the second robotic drive to travel to another chute among the first chutes 114 for receiving additional packages, or as otherwise instructed by the logistic management system 132.

Accordingly, the logistic management system 132 may coordinate the transfer of the packages 108 from the induct stations 110 on the third floor 102 to the containers 120 on the first floor 106. For example, the containers 120 may have a certain (X,Y) coordinate position on the first floor 106, and the logistic management system 132 may determine first chutes 114 that includes the same X-coordinate position as the containers 120 and second chutes 118 that include the same Y-coordinate position as the containers 120. The transfer of the packages 108 into the first chutes 114 by the first robotic drives 112, and the transfer of the packages 108 into the second chutes 118 by the second robotic drives 116, may therefore place the packages 108 into their respective containers 120 on the first floor 106.

The computer-readable media 136 may, in some instances, store, access, or otherwise maintain a database associated with the first robotic drives 112 and/or the second robotic drives 116. For example, the computer-readable media 136 may store first robotic drive data 144 that includes identifying information of the first robotic drives 112 or information that is utilized by the logistic management system 132 for controlling or managing the first robotic drives 112 (e.g., battery life, location, assigned lane within the environment 100, identifier, etc.). Similarly, the computer-readable media 136 may store second robotic drive data 146 that includes identifying information of the second robotic drives 116 or information that is utilized by the logistic management system 132 for controlling or managing the second robotic drives 116 (e.g., battery life, location, assigned lane within the environment 100, identifier, etc.).

Additionally, the computer-readable media 136 may store information associated with the packages 108 (e.g., weight, size, destination address, etc.), such as package data 148, for use by the logistic management system 132 when selecting or otherwise determine the first chutes 114 and the second chutes 118 for sorting the packages 108. The computer-readable media 136 may further include information associated with a sortation facility 138 or the environment 100 (e.g., size, floors, location of first chutes 114, location of second chutes 118, the first lanes 122, the second lanes 126, etc.), within sortation facility data 150, to permit the logistic management system 132 to instruct and/or coordinate the sortation of the packages 108. The computer-readable media 136 may also store additional information that permits the logistic management system 132 to manage the first robotic drives 112 and/or the second robotic drives 116 for sorting the packages 108 within the environment 100 (or the sortation facility 138).

FIG. 1 further illustrates the logistic management system 132 including a destination component 140 and/or a routing component 142. The destination component 140 may determine the destination of the packages 108 for use in selecting a container on the first floor 106 into which the packages 108 are to be placed. The routing component 142 may determine a route for the first robotic drives 112 and/or the second robotic drives 116 to deliver the packages 108 to their respective chutes. For example, knowing the destination address of the packages 108, or the containers 120, the routing component 142 may determine a correspond route for the first robotic drives 112 and the second robotic drives 116 to deliver the packages 108 to their intended container. The routes transmitted to the first robotic drives 112 and/or the second robotic drives 116 may include locations adjacent to, or next to, the first chutes 114 and/or the second chutes 118, respectively, at which the packages 108 are to be deposited.

Although FIG. 1 and the environment 100 illustrates a particular number of floors, first chutes 114, second chutes 118, and/or rows of the first chutes 114 and the second chutes 118, the systems and methods discussed herein may extend to smaller and/or larger environments. For example, sortation facilities may include tens or hundreds of rows of chutes and/or any number of chutes within the rows. Such scaling may assist in sorting packages according to their respective destination address. Additionally, the environments may include more than one floor for sorting packages in a first direction and/or more than one floor for sorting packages in a second direction. For example, the environment may include two floors for inducting packages and sorting packages in the first direction and/or two floors for sorting packages in the second direction. In such instances, the environment may also include any number of first robotic drives 112, second robotic drives 116, and/or other robotic drives for delivering and sorting the packages 108. Additionally, in some instances, the first lanes 122 and/or the second lanes 126 may include a different number of robotic drives and/or more robotic drives that shown in FIG. 1, for example. The environment 100 may also include additional lanes. For example, first passing lanes may be positioned adjacent to the first lanes 122 to allow the first robotic drives 112 to pass, or maneuver around, other first robotic drives 112 depositing the packages 108 into the first chutes 114. Additionally, or alternatively, the second passing lanes may be positioned adjacent to the second lanes 126 to allow the second robotic drives 116 to pass, or maneuver around, other second robotic drives 116.

The third floor 102 and/or the second floor 104 may include areas designated for recharging the first robotic drives 112 and/or the second robotic drives 116, respectively, or areas for performing maintenance on the first robotic drives 112 and/or the second robotic drives 116. The third floor 102 and/or the second floor 104 may also include holding area(s) for the first robotic drives 112 and/or the second robotic drives 116 while awaiting the packages 108 and/or instructions from the logistic management system 132. For example, after the second robotic drives 116 transfer the packages 108 to the second chutes 118, the second robotic drives 118 may travel to holding areas on the second floor 104 while awaiting instructions as to a next first chute 114 to travel to and receive additional package(s). In some instances, the second floor 104 may include any number of holding areas or the second robotic drives 116 may be configured to hold (e.g., park, idle, etc.) in any number of locations or areas on the second floor 104 (e.g., in between the first chutes 114, in between the second chutes 118, perimeter of the second floor 104, etc.). Upon receiving an instruction as to the next first chute 114 in which to receive the package 108, the second robotic drives 116 may travel to the next first chute 114 (e.g., vertically beneath) to receive the package 108. In some instances, the centralized management system 132 may spread or equally distribute the second robotic drives 116 about the second floor 116 to limit an amount of time it takes for the second robotic drives 116 to travel to the first chutes 114 to receive additional packages 108.

Figure 2A:
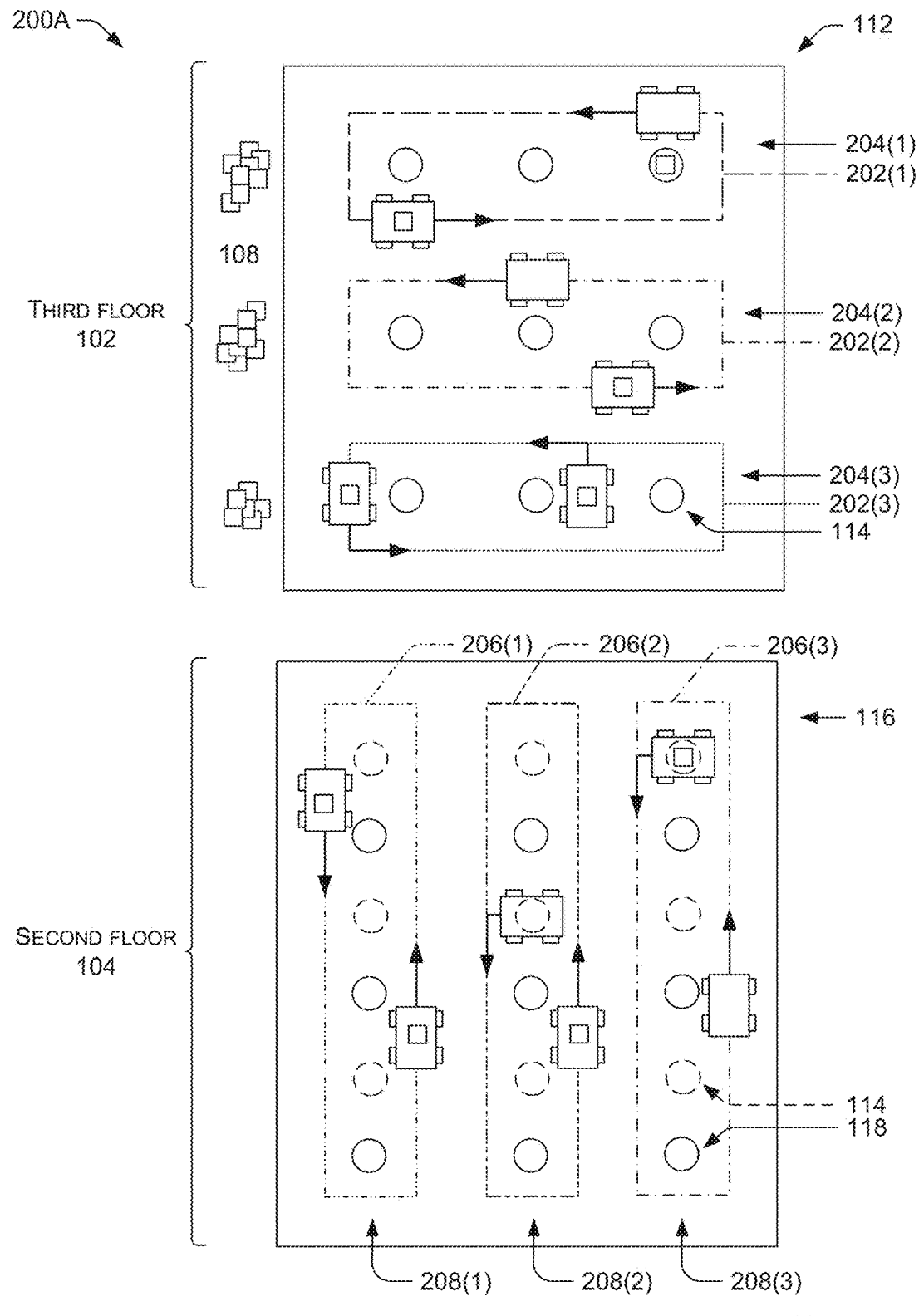
FIG. 2A illustrates an example environment for sorting packages using robotic drives, according to an embodiment of the present disclosure. In some instances, one or more floors of the environment may include first robotic drives that sort packages in a first direction, while one or more additional floors may include second robotic drives that sort packages in a second, different direction.

FIG. 2A illustrates an example environment 200A for sorting packages. In some instances, the environment 200A may include the third floor 102 and/or the second floor 104. As shown, the third floor 102 may include the packages 108 for sorting within the environment 200A. In some instances, the environment 200A may correspond to a facility in which orders are packaged and sorted. In some instances, the packages 108 may be located at and/or adjacent to the induct stations 110, a packaging station, and/or inventory. In some instances, the packages 108 may arrive on the third floor 102 from one or more locations within the environment 200A via conveyors, belts, elevators, etc.

The third floor 102 may include the first robotic drives 112 onto which the packages 108 are placed for delivering to the first chutes 114 that extend between the third floor 102 and the second floor 104. The third floor 102 may also include lanes in which the first robotic drives 112 travel. For instance, the third floor 102 may include a first lane 202(1) in which first robotic drives 204(1) travel, a second lane 202(2) in which first robotic drives 204(2) travel, and a third lane 202(3) in which first robotic drives 204(3) travel. The first lane 202(1), the second lane 202(2), and/or the third lane 202(3) may primarily extend in a first direction (e.g., X-direction) or along a first axis (e.g., X-axis) and in which the first robotic drives 204(1), the first robotic drives 204(2), and/or the first robotic drives 204(3) travel, respectively. However, in some instances, the first robotic drives 204(1), the first robotic drives 204(2), and/or the first robotic drives 204(3) may depart from the first lane 202(1), the second lane 202(2), and/or the third lane 202(3), respectively, for delivering the packages 108 to the first chutes 114. For example, as shown in the third lane 202(3), a robotic drive of the first robotic drives 204(3) may exit off or depart from the third lane 202(3) for depositing a package into a first chute. In some instances, the first robotic drives 204(1), the first robotic drives 204(2), and/or the first robotic drives 204(3) may each receive the packages 108 from a respective induct station 110 corresponding to the first lane 202(1), the second lane 202(2), the third lane 202(3), respectively.

The second floor 104 includes the second robotic drives 116 for receiving the packages 108 from the first chutes 114. The second robotic drives 116 may deliver the packages 108, as received from the first chutes 114, to the second chutes 118 that extend between the second floor 104 and a lower floor (e.g., the first floor 106 as discussed above in FIG. 1). As also shown in FIG. 2A, in some instances, the first chutes 114 and the second chutes 118 may not vertically align (e.g., Z-directions) to permit the second robotic drives 116 to receive the packages 108 and sort the packages 108 in a second direction (e.g., Y-direction).

The second floor 104 includes lanes in which the second robotic drives 116 travel. For instance, the second floor 104 may include a first lane 206(1) in which second robotic drives 208(1) travel, a second lane 206(2) in which second robotic drives 208(2) travel, and a third lane 206(3) in which second robotic drives 208(3) travel. The first lane 206(1), the second lane 206(2), and/or the third lane 206(3) may primarily extend in a second direction (e.g., Y-direction) or along a second axis (e.g., Y-axis) and in which the first robotic drives 208(1), the first robotic drives 208(2), and/or the first robotic drives 208(3) travel, respectively However, in some instances, the first robotic drives 208 (1), the first robotic drives 208(2), and/or the first robotic drives 208(3) may depart from the first lane 206(1), the second lane 206(2), and/or the third lane 206(3), respectively, for delivering the packages 108 to the second chutes 118 and/or receiving the packages 108 from the first chutes 114. For example, as shown in the second lane 206(2) and the third lane 206(3), robotic drives may exit off or depart from the second lane 206(2) and the third lane 206(3), respectively, for receiving packages from the first chutes 114, respectively.

In some instances, the first robotic drives 204(1), the first robotic drives 204(2), and/or the first robotic drives 204(3) may utilize markers on the third floor 102 for traveling within the first lane 202(1), the second lane 202(2), and/or the third lane 202(3), respectively, to deliver the packages 108 to the first chutes 114 and/or traveling to and from the induct stations 110. Additionally, or alternatively, the first robotic drives 208(1), the first robotic drives 208(2), and/or the first robotic drives 208(3) may utilize markers on the second floor 104 for traveling within the first lane 206(1), the second lane 206(2), and/or the third lane 206(3) to deliver the packages 108 to the second chutes 118 and/or traveling to and from the second chutes 118 to receive the packages 108.

FIG. 2B illustrates an environment 200B for sorting packages. As compared to the environment 100 and/or the environment 200A, the environment 200B illustrates that the third floor 102 may include induct stations locate at opposing ends of the first lanes 122. For example, first induct stations 210 may be located on a first end, or side, of the first lanes 122 while second induct stations 212 may be located on a second end, or side, of the first lanes 122. As shown, the first induct stations 210 and the second induct stations 212 may be located on opposing ends of the first lanes 122, respectively and includes packages for induction. The first robotic drives 112 may be configured to receive the packages 108 at corresponding first induct stations 210 and/or second induction induct stations 212 based on a location or first chutes 114 the first robotic drives 112 deposit the packages 108.

For example, the third floor 102 may in some instances be divided into halves, areas, or portions via a line 214. In some instances, the line 214 may represent a boundary between a first portion of the third floor 102, or a first side 216 of the third floor 102, and a second portion of the third floor 102, or a second side 218 of the third floor 102. In this sense, the line 214 may separate the first side 216 and the second side 218. The line 214 may be utilized to determine which induct stations the first robotic drives 112 receive packages for sorting within the environment 200B. If the first robotic drives 112 are instructed to deliver a package on the first side 216 of the environment 200B, the first robotic drives 112 may return to the first induct stations 210 to receive additional packages. Additionally, or alternatively, if the first robotic drives 112 are instructed to deliver a package on the second side 218 of the environment 200B, the first robotic drives 112 may return to the second induct stations 212 to receive additional packages.

By way of example, a first robotic drive 220 may receive a package at a first induct station among the first induct stations 210. As shown, the first robotic drive 220 may receive the package on the first side 216 of the third floor 102. The first robotic drive 220 may therein travel to a first chute 222 among the first chutes for depositing the package. Here, the first robotic drive 220 may travel to the second side 218 of the third floor 102. After depositing the package into the first chute 222, the first robotic drive 220 may travel to a second induct station among the second induct stations 212. Rather than returning to the first induct station on the first side 216, the first robotic drive 220 may travel to the second induct station to receive additional packages. That is, while on the second side 218, the first robotic drive 220 may take advantage of its location and receive additional packages for sortation. Conversely, if the first robotic drive 220 delivered a package on the first side 216, the first robotic drive 220 may travel to the first induct stations 210 for receiving additional packages.

In some instances, the first robotic drives 112 may cut across the first lanes 122, respectively, to return to the first induct stations 210 and/or the second induct stations 212. For example, if the first robotic drive 220 delivers a package on the first side 216, the first robotic drive 220 may perform a "U-turn" and cut across the first lane, respectively, for returning to the first induct stations 210. In such instances, the first robotic drives 112 may travel a reduced distance for returning to the first induct stations 210 and receiving additional packages.

The centralized management system 132 may be configured to determine and instruct the first robotic drives 112 as to a next or subsequent induct station for receiving packages. For example, upon instructing the first robotic drives 112 to travel to the first chutes 114, the centralized management system 132 (or component thereof) may determine a location of the first chute 114, such as whether the first robotic drives 112 are delivering packages on the first side 216 or the second side 218. If the packages are being delivered on the first side 216, the centralized management system 132 may instruct the first robotic drives 112 to return to the first induct stations 210 for receiving additional packages. Alternatively, if the first robotic drives 112 are delivering packages on the second side 218, the centralized management system 132 may instruct the first robotic drives 112 to return to the second induct stations 212 for receiving additional packages. However, in some instances, the first robotic drives 112 may congregate or become bunched on a particular side of the third floor 102. Here, if the centralized management system 132 determines that too many, or above a threshold number, of first robotic drives 112 are on a side of the third floor 102 (or a side of the lane), the centralized management system 102 may redistribute the first robotic drives 112 across the sides. Redistributing the first robotic drives 112 may ensure that the first robotic drives 112 are appropriated or load balanced across the sides such that the first robotic drives 112 receive packages from the first induct stations 210 and the second induct stations 212.

Figure 3:
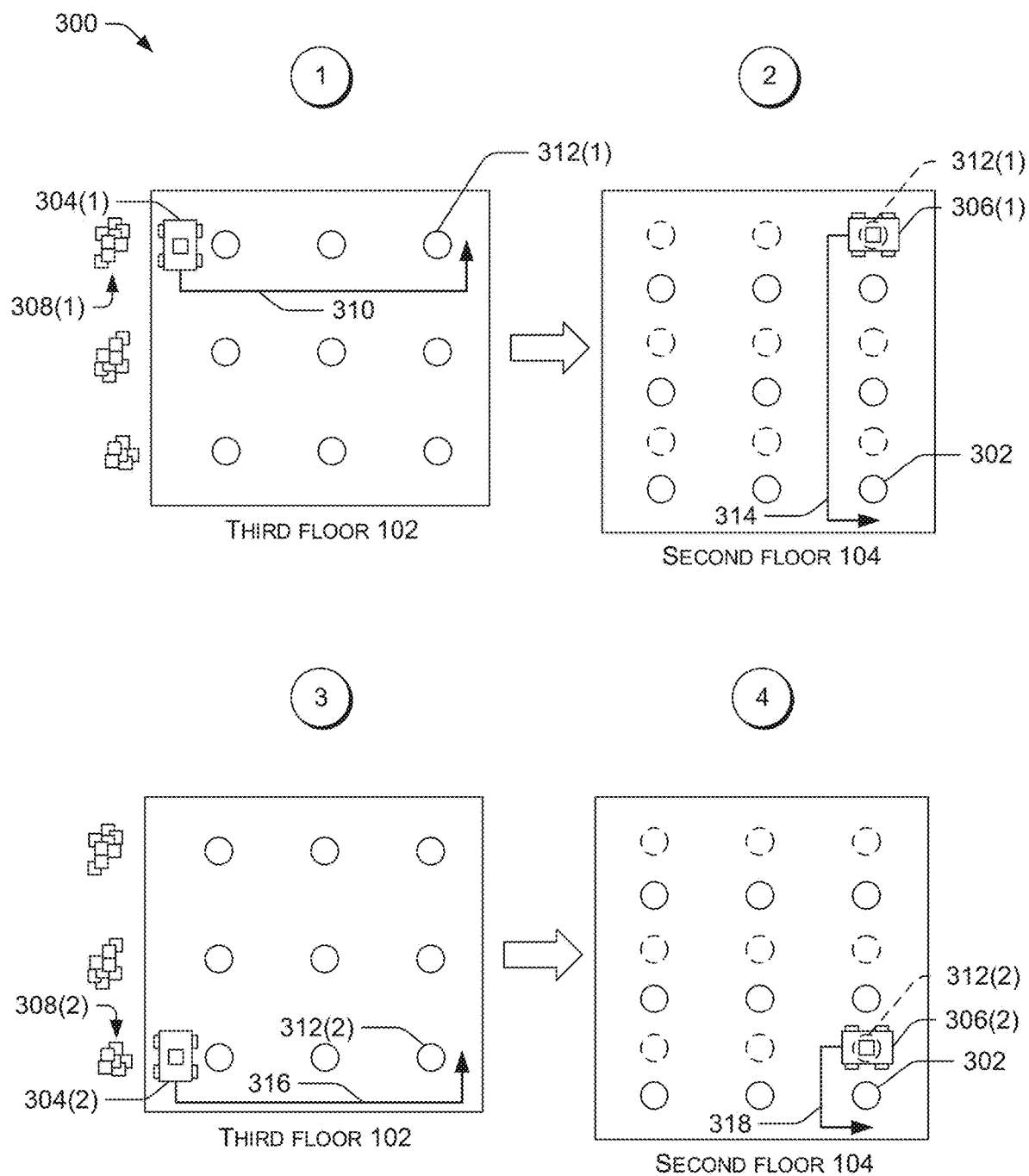
FIG. 3 illustrates an example environment for sorting packages from different induct stations to a common container, according to an embodiment of the present disclosure.

FIG. 3 illustrates an example environment 300 showing a flow of operations in instances where robotic drives sort and deliver packages to containers. As shown, the environment 300 may include the third floor 102 and the second floor 104. The third floor 102 may include the first robotic drives 112 for sorting the packages 108 into the first chutes 114 while the second floor 104 may include the second robotic drives 116 for sorting the packages 108 into the second chutes 118.

In particular, FIG. 3 illustrates a scenario whereby the packages 108 are delivered to a respective container despite being inducted at different locations on the third floor 102. As part of this process, the first robotic drives 112 may align the packages 108 with the containers 120 in a first direction (e.g., X-direction) or along a first axis (e.g., X-axis) and the second robotic drives 116 may align the packages 108 with the containers 120 in a second direction (e.g., Y-direction) or along a second axis (e.g., Y-axis).

For example, the second floor 104 may include a chute 302 among the second chutes 118 associated with a destination address or location, such as Denver, Colo. The first robotic drives 112 and the second robotic drives 116 may coordinate to deposit the packages 108 destined for Denver into the chute 302. For example, a first robotic drive 304(1) on the third floor 102 and first robotic drive 304(2) on the third floor 102 may each receive, from respective induct stations 110, a package destined for Denver, Colo. The first robotic drive 304(1) and the first robotic drive 304(2) may deliver the package 108 to chutes that align the with the container (or the chute 302) in a first direction (e.g., X-direction). A second robotic drive 306(1) on the second floor 104 may receive a package from the first robotic drive 304(1) and a second robotic drive 306(2) on the second floor 104 may receive a package from the first robotic drive 304(2).

For example, at "1" the first robotic drive 304(1) may receive a first package from a first induct station 308(1) and drive along a route 310 to a first chute 312(1) among the first chutes 114. The first chute 312(1) may align, in a first direction (e.g., X-direction), with the container associated with Denver, Colo., or with the chute 302. At "2" and on the second floor 104, the second robotic drive 306(1) may receive the first package and drive along a route 314 to the container 120 associated with Denver, Colo. Here, the second robotic drive 306(1) may deposit the first package into the chute 302. As such the first robotic drive 304(1) and the second robotic drive 306(1) may operate on separate floors to reduce congestion and/or crisscrossing, as the first robotic drive 304(1) and the second robotic drive 306(1) travel in different directions, to deposit the first package into the chute 302.

Meanwhile, the first robotic drive 304(2) at "3" may receive a second package from a second induct station 308(2) and drive along a route 316 to a first chute 312(2) of the first chutes 114. As shown, the first chute 312(2) may align, in a first direction (e.g., X-direction), with the container associated with Denver, Colo., or with the chute 302. At "4" and on the second floor 104, the second robotic drive 306(2) may receive the second package and drive along a route 318 to the chute 302. At the chute 302, the second robotic drive 306(2) may deposit the second package into the chute 302.

FIG. 3 therefore illustrates a scenario whereby despite an induction location of the packages, the first robotic drives 112 and the second robotic drives 116 may function to deposit the packages 108 into their associated containers 120. Such scenario may eliminate or reduce the pre-sorting the packages 108 before the packages 108 are inducted. That is, the first robotic drives 112 may travel in a first direction (e.g., X-direction) on the third floor 102 and the second robotic drives 116 may travel in second direction (e.g., Y-direction) on the second floor 104 to reduce congestion and/or crisscrossing within the environment 300.

Figure 4:
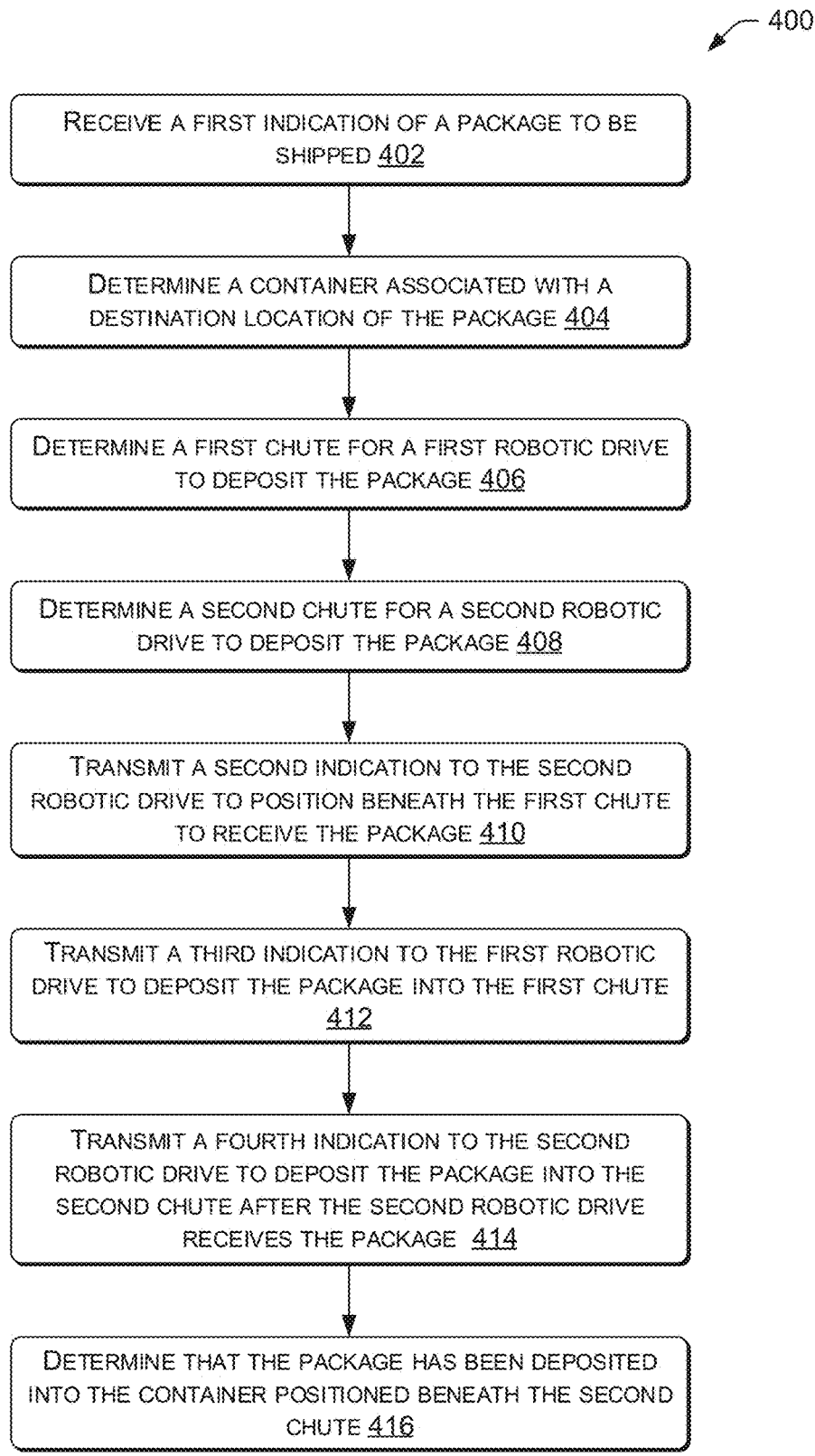
FIG. 4 illustrates an example process for sorting packages using robotic drives, according to an embodiment of the present disclosure.
Figure 5:
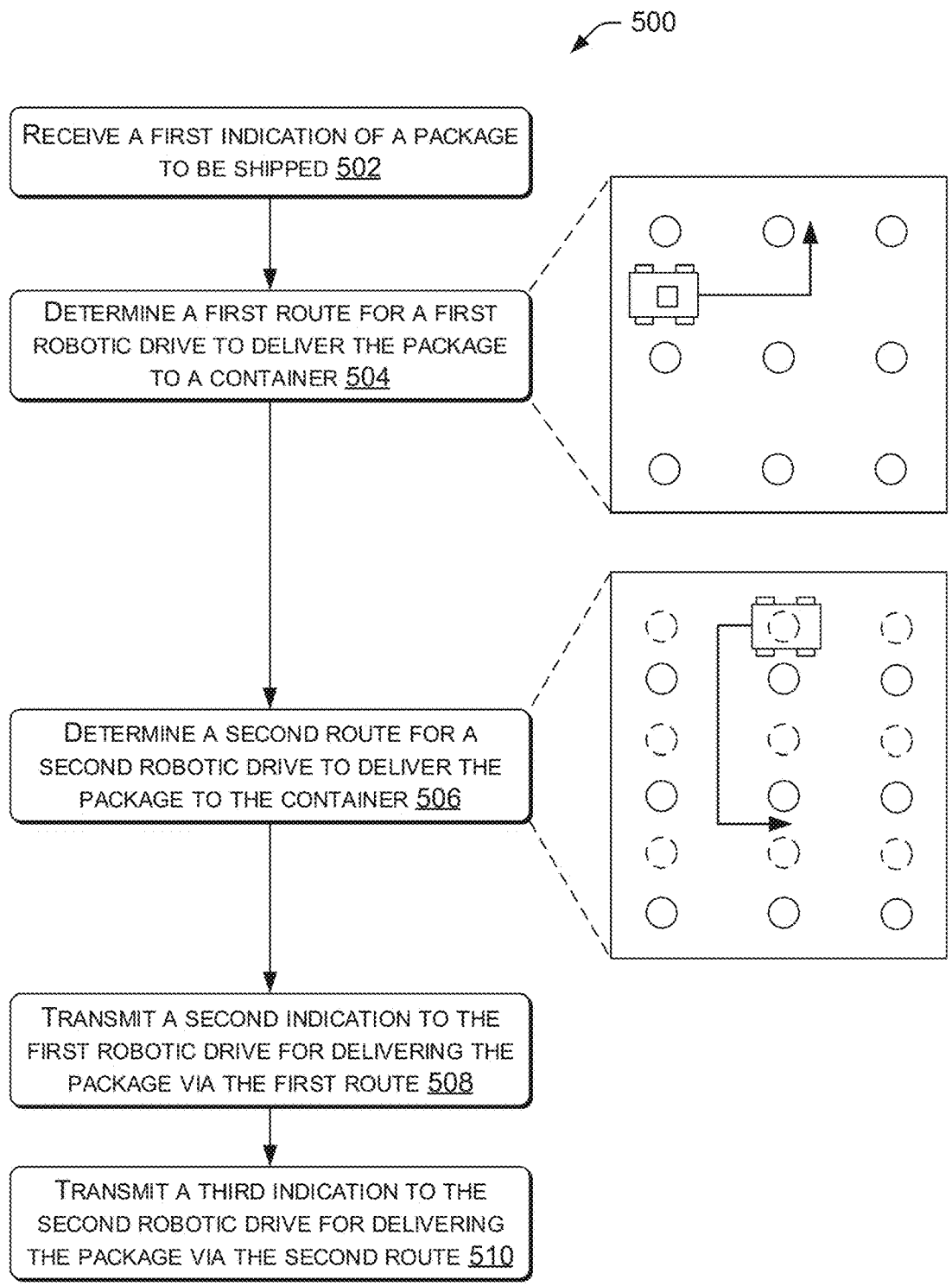
FIG. 5 illustrates an example process for determining routes for robotic drives to sort packages, according to an embodiment of the present disclosure.
Figure 6:
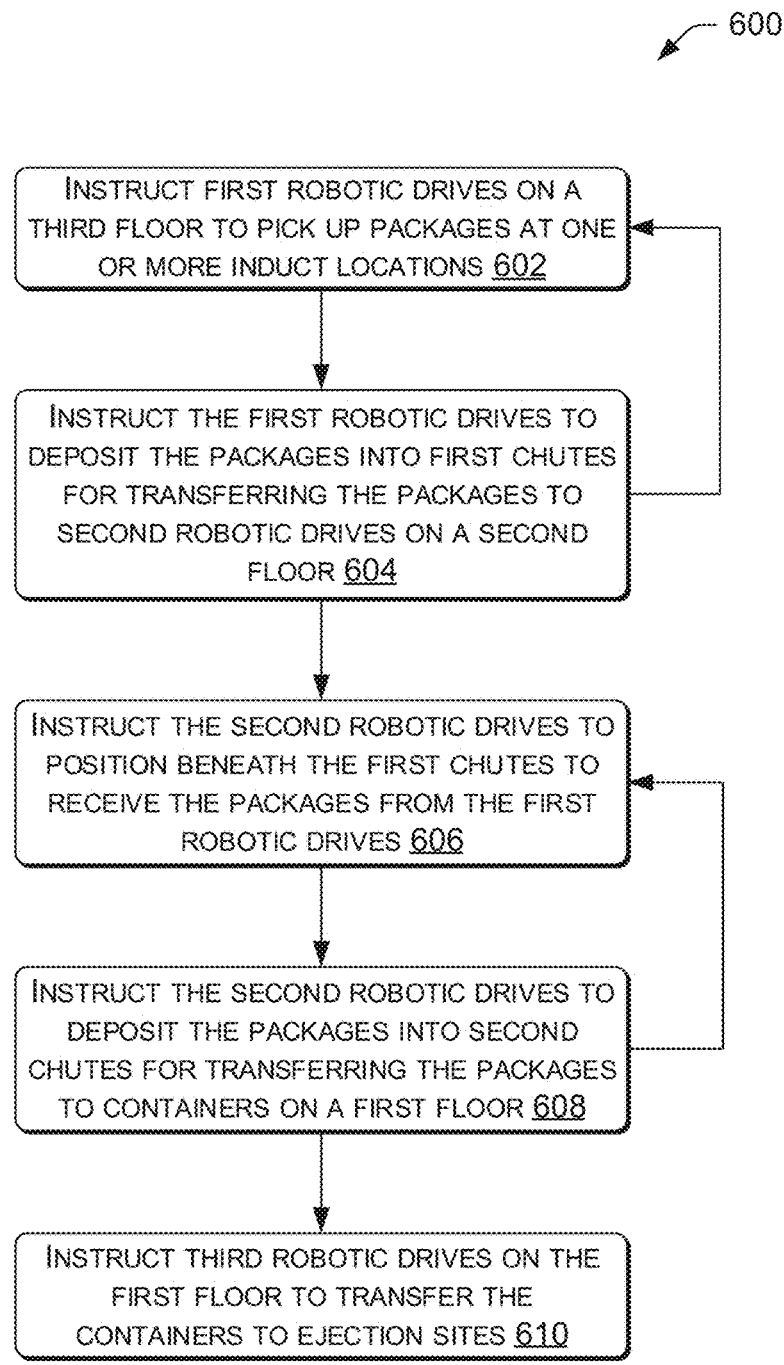
FIG. 6 illustrates an example process for instructing robotic drives to sort packages, according to an embodiment of the present disclosure.

FIGS. 4-6 illustrate various processes related to sorting packages within an environment. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1-3, although the processes may be implemented in a wide variety of other environments, architectures, and systems.

FIG. 4 illustrates an example process 400 for sorting packages within an environment (e.g., sortation facility). In some instances, the process 400 may be performed by the logistic management system 132.

At 402, the process 400 may receive a first indication of a package to be shipped. For example, the logistic management system 132 may receive, or otherwise determine, a package to be shipped.

At 404, the process 400 may determine a container associated with a destination location of the package. For example, the logistic management system 132 (e.g., the destination component 140), may scan a barcode of the package 108 or otherwise determine a shipping address, destination address, and/or destination location of the package 108. Based at least in part on the destination location, the logistic management system 132 may determine a corresponding container 120 within an environment into which the package 108 is to be placed or sorted. By way of example, the logistic management system 132 may determine that the package 108 is destined for Milwaukee, Wis. and may determine or select a container within the environment corresponding to Milwaukee, Wis. Discussed above, in some instances, the containers 120 into which packages 108 are placed may be located on a bottom, lower, or first floor (e.g., the first floor 106) of the environment.

At 406, the process 400 may determine a first chute for a first robotic drive to deposit the package. For example, the environment may include a plurality of first chutes (e.g., the first chutes 114) that extend between a third floor (e.g., the third floor 102) and a second floor (e.g., the second floor 104). On the third floor 102, the first robotic drive (e.g., the first robotic drives 112) may deliver the package 108 to the first chute and deposit the package 108 into the first chute. The first chute may serve to align the package 108, once deposited into the first chute, with the container 120 corresponding to Milwaukee, Wis., for example (e.g., X-direction). The logistic management system 132 may determine the first chute among the first chutes 114 knowing the location of the container 120 (e.g., via the sortation facility 138).

At 408, the process 400 may determine a second chute for a second robotic drive to deposit the package. For example, the environment may include a plurality of second chutes (e.g., the second chutes 118) that extend between the second floor and the first floor. On the second floor, the second robotic drive (e.g., the second robotic drives 116) may deliver the package 108 to the second chute and deposit the package 108 into the second chute. The second chute may correspond to a chute into which packages 108 are placed destined for Milwaukee, Wis. The logistic management system 132 may determine the second chute among the second chutes knowing the location of the container 120 (e.g., via the sortation facility 138). Accordingly, the second robotic drive may travel to the second chute to align the package 108 (e.g., Y-direction) with the container.

At 10, the process 400 may transmit a second indication to the second robotic drive to position beneath the first chute to receive the package. For example, the logistic management system 132 may transmit an indication (or instruction) to the second robotic drive to position beneath the first chute. In some instances, the first chute and/or the second robotic drive may include components for receiving the package 108 or placing the package 108 onto the second robotic drive. By way of example, the first chute may include webs, bumpers, or nets that control a rate at which the package 108 descends within the first chute to the second robotic drive.

At 412, the process 400 may transmit a third indication to the first robotic drive to deposit the package into the first chute. For example, the logistic management system 132 may transmit an indication (or instruction) to the first robotic drive to deposit the package 108 into the first chute. In some instances, the indication transmitted to first robotic drive may include a location utilized by the first robotic drive to travel to the first chute. Additionally, or alternatively, the logistic management system 132 may provide the first robotic drive with a route to travel along when delivering the package to the first chute. The first robotic drive may utilize imaging cameras, sensors, or other navigational components to travel along the route and/or to the first chute to deposit the package 108. In some instances, after the first robotic drive deposits the package 108 into the first chute, the first robotic drive may return to the induct stations 110 to receive additional packages 108 for transferring to the containers 120 (e.g., the same container or other containers). As discussed above, the first robotic drive may return to a corresponding induct station located on a particular side of the floor, or lane within which the first robotic drive travels, based on the location of the first robotic drive and/or the location the first robotic drive deposited the package.

At 414, the process 400 may transmit a fourth indication to the second robotic drive to deposit the package into the second chute. For example, the logistic management system 132 may transmit an indication (or instruction) to the second robotic drive to deposit the package 108 into the second chute. In some instances, the indication transmitted to second robotic drive may include a location utilized by the second robotic drive to travel to the second chute. Additionally, or alternatively, the logistic management system 132 may provide the second robotic drive with a route to travel along when delivering the package 108 to the second chute. The second robotic drive may utilize imaging cameras, sensors, or other navigational components to travel along the route and/or to the second chute to deposit the package 108. In some instances, the second robotic drive may transmit an indication indicating that the second robotic drive received the package 108, and thereafter, the logistic management system 132 may instruct the second robotic drive to travel to the second chute. Such indication may serve, in some instances, as an acknowledgement that the second robotic drive received the package 108.

In some instances, the first robotic drive may autonomously transfer the package 108 upon arriving at the first chute and without receiving the fourth indication (or instruction) at 414 from the logistic management system 132.

At 416, the process 400 may determine that the package has been deposited into the container. For example, the logistic management system 132 may receive an indication or otherwise determine that the package 108 was deposited into the second chute. In some instances, the logistic management system 132 may receive an indication from the second robotic drive indicating the deposit of the package 108 into the second chute and/or may receive an indication from sensors on the first floor indicating the deposit of the package 108 into the container 120.

FIG. 5 illustrates an example process 500 for sorting packages within an environment (e.g., sortation facility). In some instances, the process 500 may be performed by the logistic management system 132.

At 502, the process 500 may receive a first indication of a package to be shipped. For example, the logistic management system 132 may receive an indication, or otherwise determine, a package 108 for shipment. In some instances, the logistic management system 132 may determine a shipping address or destination of the package 108.

At 504, the process 500 may determine a first route for a first robotic drive associated with delivering the package to a container. For example, the logistic management system 132 may determine a container 120 corresponding to the destination of the package 108 as well as a first route for the first robotic drive to travel from an induct station 110 to a first chute corresponding to transferring the package 108 from one floor of the environment to another. In some instances, the first route may include sorting the package 108 in a first direction or along a first axis within the environment (e.g., X-direction/X-axis). The first route may also include an indication of a subsequent induct station for which the first robotic drive is to travel to and receive additional packages (e.g., based on the location of the first chute).

At 506, the process 500 may determine a second route for a second robotic drive associated with delivering the package to the container. For example, the logistic management system 132 determine the second route for the second robotic drive to travel along based at least in part on the first chute from which the second robotic drive receives the package 108 and a second chute corresponding to transferring the package 108 from one floor of the environment to another. In some instances, the second route may include sorting the package 108 in a second direction or along a second axis within the environment (e.g., Y-direction/Y-axis). The second route may also include an indication of a holding area the second robotic drive is to travel to after depositing the package and while awaiting an instruction of another first chute the second robotic drive is to receive a package.

At 508, the process 500 may transmit a second indication to the first robotic drive for delivering the package via the first route. For example, the logistic management system 132 may transmit the first route (or data associated therewith) to the first robotic drive for use by the first robotic drive in sorting the package 108. Utilizing the first route, for example, the first robotic drive may travel along the first route (e.g., first lanes 122) to the first chute, deposit the package 108, and return to the induct stations 110 to receive additional packages 108. In some instances, the logistic management system 132 may transmit the second indication to the second robotic drive indicating the arrival of the inbound second robotic drive, thereby serving to notify the first robotic drive to transfer the package 108.

At 510, the process 500 may transmit a third indication to the second robotic drive for delivering the package via the second route. For example, the logistic management system 132 may transmit the second route (or data associated therewith) to the second robotic drive for use by the second robotic drive in sorting the package 108. Utilizing the second route, for example, the second robotic drive may travel along the second route (e.g., second lanes 126), from the first chute to the second chute, deposit the package 108 into the second chute, and return to the first chutes 114 to receive additional packages 108.

FIG. 6 illustrates an example process 600 for sorting packages within an environment (e.g., sortation facility). In some instances, the process 600 may be performed by the logistic management system 132.

At 602, the process 600 may instruct first robotic drives on a third floor within an environment to pick up package(s) at one or more induct sites. For example, the logistic management system 132 may instruct the first robotic drives 112, respectively, to pick up or receive the packages 108 at induct station 110 on the third floor 102. As discussed above, the first robotic drives 112 may receive the packages 108 at a designated induct station within the first lanes 122 the first robotic drives 112 are respectively configured to travel.

At 604, the process 600 may instruct the first robotic drives to deposit the packages into first chutes for transferring the packages to second robotic drives on a second floor within the environment. For example, the logistic management system 132 may instruct the first robotic drives 112 to deposit the packages 108, respectively, into the first chutes 114 for transferring the packages 108 to the second robotic drives 116, respectively, on the second floor 104. In some instances, the first robotic drives 112 may await depositing the packages 108 until the second robotic drives 116 are positioned beneath the first chutes 114.

From 604, the process 600 may loop to 602 whereby the first robotic drives 112 may receive additional packages 108. For example, the logistic management system 132 may instruct the first robotic drives 112 to return to their respective induct station 110 to receive additional package(s) 108 for sorting within the environment. The first robotic drives 112 may return to the same induct station and/or other induct stations (e.g., on another end) depending on the location of the first robotic drives 112 or which side of the first lanes 122 the first robotic drives deposit the packages. In some instances, logistic management system 132 may wait to instruct the first robotic drives 112 to pick up the additional packages 108 until after the packages 108 have been transferred to the second robotic drives 116.

At 606, the process 600 may instruct the second robotic drives to position beneath the first chutes to receive the packages from the first robotic drives. For example, the logistic management system 132 may instruct the second robotic drives 116 to align or otherwise position beneath the first chutes 114 to receive the packages 108.

At 608, the process 600 may instruct the second robotic drives to deposit the packages into second chutes for transferring the packages to containers on a first floor within the environment. For example, the logistic management system 132 may instruct the second robotic drives 116 to deposit the packages 108, respectively, into the second chutes 118 for transferring the packages 108 to the containers 120, respectively, on the first floor 106. In some instances, the logistic management system 132 may await instructing the second robotic drives 116 until the logistic management system 132 receives an indication that the second robotic drives 116 receive the packages 108, respectively. Additionally, or alternatively, prior to instructing the second robotic drives 116 of the next first chute to position beneath, the centralized management system 132 may instruct the second robotic drives 116 to travel to holding areas or other areas in which the second robotic drives 112 await instructions.

From 608, the process 600 may loop to 606 whereby the second robotic drives may receive additional packages for sorting. For example, the logistic management system 132 may instruct the second robotic drives 116 to position beneath or otherwise receive the additional packages 108 via the first chutes 114.

At 610, the process 600 may instruct third robotic drives on the first floor to transfer the container to ejection sites within the environment. For example, the logistic management system 132 may instruct the third robotic drives to eject the containers 120 upon the containers 120 becoming full (e.g., weight, volume, etc.).

Figure 7:
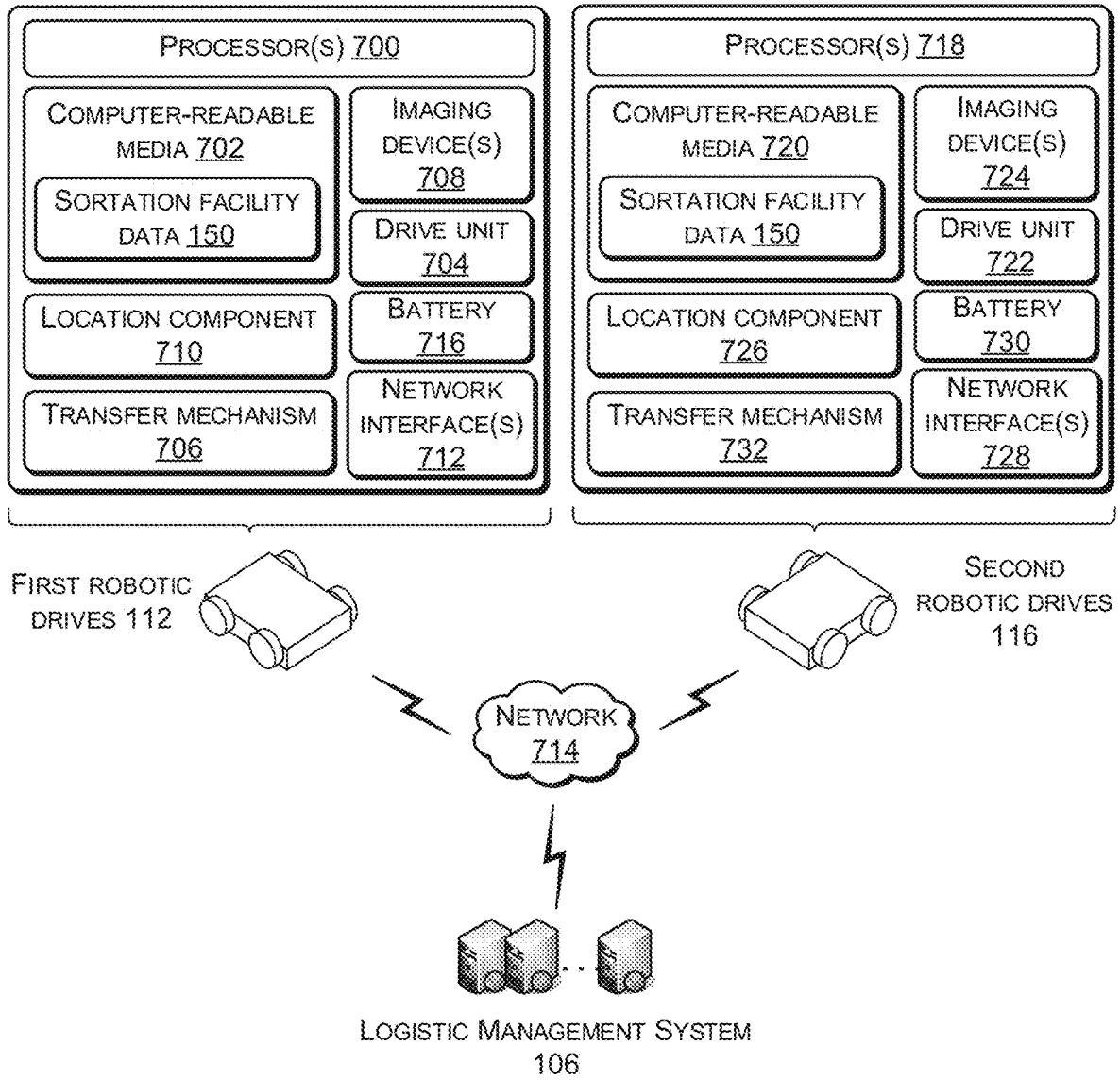
FIG. 7 illustrates example components of robotic drives usable to sort packages, according to an embodiment of the present disclosure.

FIG. 7 illustrates selected functional components of the first robotic drives 112 and the second robotic drives 116. In some instances, the first robotic drives 112 and the second robotic drives 116 may include similar components and/or functionality.

As illustrated, and in some instances, the first robotic drive 112 may include processor(s) 700, computer-readable media 702, a drive unit 704, a transfer mechanism 706, imaging device(s) 708, a location component 710, and/or network interface(s) 712. The processor(s) 700 may perform various functions or operations associated with sorting the packages 108, while the computer-readable media 702 may store instructions executable by the processor(s) 700 to store the operations described herein. The computer-readable media 702 for example may store the sortation facility data 150 for navigating and/or maneuvering with the environment 100.

Generally, the first robotic drive 112 includes a body to provide structural support as well as an outer encasing for protecting the components of the first robotic drive 112. The first robotic drive 122 has the drive unit 704 for moving the first robotic drive 112 within the environment 100. The drive unit 704 is configured to move the first robotic drive 112 in response to receiving instructions from the logistic management system 132 and/or as otherwise instructed by the processor(s) 700. In this sense, the drive unit 704 has corresponding electronics to control movement of drive unit 704, which maneuvers the first robotic drive 112 within the environment 100. In some instances, the drive unit 704 may include an orientation component, such as a gyroscope, and a position location component, such as a GPS (global positioning system) unit for traveling and/or moving about the environment 100.

The drive unit 704 may include a motor or any type of mechanical or electrical engine of sufficient size and power to move the first robotic drive 112. In some instances, the drive unit 704 includes a tread mechanism with a track that is mounted on, and rotated by, a set of wheels. In other implementations, the drive unit 704 may be embodied in any number of arrangements, including with wheels, digit members (e.g., leg-type members), a suspended wiring assembly, a drive unit mounted on a track, articulating arm members that move etc. In some instances, the drive unit 704 may facilitate one or more degrees of movement to allow rotation about a vertical axis, rotation about a tilt axis, and rotation about a pan axis. One or more motors may be further included to power the movement about the vertical, tilt, and pan axes.

The first robotic drive 112 may include the transfer mechanism 706 for transferring packages to the first chutes 114. In some instances, the transfer mechanism 706 may include a conveyor belt, an arm, or a tilt that operates to transfer the packages 108 to the first chutes 114. For example, upon arriving at the first chutes 114, the processor(s) 700 may instruct the transfer mechanism 706 to operate and transfer the packages 108. In some instances, a motor of the drive unit 704 (and/or another motor of the first robotic drive 112) may power the transfer mechanism 706.

Additionally, the transfer mechanism 706 may further include a lift that extends portions of the first robotic drive 112 at various heights.

The imaging device(s) 708 may image the marker(s) within the environment 100 to ascertain orientation and/or location. For example, the processor(s) 700 may receive image data associated with the markers and may compare the image data to a database of marker(s) stored in the computer-readable media 702. The database of marker(s) may maintain, for each maker, the position of the marker within the environment 100. Through this comparison, the processor(s) 700 may determine an orientation and/or location within the environment 100, which may be utilized by the first robotic drive 112 when moving within the environment 100. For example, after determining the orientation and/or location, the processor(s) 700 may cause the drive unit 704 to travel to certain locations or in certain directions within the environment 100.

Additionally, the first robotic drive 112 may include the location component 710, such as a GPS, local beacons, spatial grid systems, triangulation systems, and the like. The location component 710 may be utilized by the logistic management system 132 to track or otherwise determine a location of the first robotic drive 112 within the environment 100. Such information may be utilized to instruct the first robotic drive 112 to move about the environment 100. The location component 710 may also be utilized to identify a location of the first robotic drive 112 within the environment 100.

The first robotic drive 112 further includes the network interface(s) 712 to communicate with other moveable devices, such as other first robotic drives 112, the second robotic drives 116, and/or the logistic management system 132 via a network 714. For example, the first robotic drive 112 may communicate with the second robotic drives 116 to confirm the second robotic drives 116 are positioned below the first chutes 114 before transferring the packages 108. The network interface(s) 712 enables access to one or more types of networks, including wired and wireless networks. When implemented as a wireless unit, the network interface(s) 712 use an antenna to send and receive wireless signals. In some instances, the first robotic drive 112 may communicatively couple to other first robotic drives 112, the second robotic drives 116, and/or the logistic management system 132 using one or more communication channel(s), or network(s), such as Bluetooth (e.g., 802.11), Bluetooth Low Energy (BLE), ZigBee (e.g., 802.15.4), Z-wave, Wi-Fi, or the like.

The network 714 may represent any type of communication network, including a data network, and may be implemented using wired infrastructure (e.g., cable, CATS, fiber optic cable, etc.), a wireless infrastructure (e.g., RF, cellular, microwave, satellite, Bluetooth, etc.), and/or other connection protocols.

A battery 716 is further provided to distribute power to the various components of the first robotic drive 112.

As illustrated, and in some instances, the second robotic drive 116 may include processor(s) 718, computer-readable media 720, a drive unit 722, imaging device(s) 724, a location component 726, and/or network interface(s) 728. The processor(s) 718 may perform various functions or operations associated with sorting the packages 108, while the computer-readable media 720 may store instructions executable by the processor(s) 718 to store the operations described herein. The computer-readable media 720 for example may store the sortation facility data 138 for navigating and/or maneuvering with the environment 100.

Generally, the second robotic drive 116 includes a body to provide structural support as well as an outer encasing for protecting the components of the second robotic drive 116. The second robotic drive 116 has the drive unit 722 for moving the second robotic drive 116 within the environment 100. In some instances, the drive unit 722 may be similar to and/or include similar components and/or functionalities as the drive unit 704 of the first robotic drive 112. For example, the drive unit 722 may receive directional information from the second robotic drive 116 and may move in response to receiving instructions from the logistic management system 132, and/or as otherwise instructed by the processor(s) 718.

The imaging device(s) 724 may image the marker(s) within the environment 100 to ascertain orientation and/or location. The computer-readable media 720 may further store the database of markers, which may be used to determine an orientation and/or location within the environment 100. The location component 726, such as a GPS, local beacons, spatial grid systems, triangulation system, and the like may also be utilized to identify a location of the second robotic drive 116 within the environment 100 and for use when instructing the second robotic drive 116 to travel within the environment 100.

The second robotic drive 116 may include the transfer mechanism 732 for transferring packages to the second chutes 118. In some instances, the transfer mechanism 732 may be similar to and/or include similar components as the transfer mechanism 706.

The network interface(s) 728 may permit the second robotic drive 116 to communicate with other moveable devices, such as other second robotic drives 116, the first robotic drives 112, and/or the logistic management system 132. A battery 730 is further provided to distribute power to the various components of the second robotic drive 116.

As used herein, a processor, such as processor(s) 134, the processor(s) 700, and/or the processor(s) 718 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The computer-readable media 136, the computer-readable media 702, and/or the computer-readable media 720 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable media storing computer-executable instructions that, when executed by the one or more processors, cause the one or more processors to perform acts comprising:
receiving a first indication of a package to be sorted within a sortation facility;
determining a container on a bottom floor of the sortation facility associated with shipment of the package, wherein the container is determined based on a destination address of the package;
determining a first robotic drive located on a top floor of the sortation facility to transport the package to a first chute that extends between the top floor and a middle floor of the sortation facility, wherein the first chute is aligned with the container in a first direction within the sortation facility;
determining a second robotic drive located on the middle floor to transport the package from the first chute to a second chute that extends between the middle floor and the bottom floor, wherein the second chute is aligned with the container in a second direction within the sortation facility and the second chute transfers the package to the container;
transmitting a first instruction to the second robotic drive to position beneath the first chute to receive the package;
transmitting a second instruction to the first robotic drive to deposit the package into the first chute;
receiving a second indication indicating that the second robotic drive received the package;
transmitting a third instruction to the second robotic drive to deposit the package into the second chute; and
receiving a third indication indicating that the package has been deposited into the container.

2. The system of claim 1, the acts further comprising:
transmitting, to the first robotic drive, a fourth instruction to receive an additional package to be sorted within the sortation facility; and
transmitting, to the second robotic drive, a fifth instruction to at least:
position beneath the first chute to receive one or more additional packages,
position beneath an additional chute to receive the one or more additional packages, the additional chute extending between the top floor and the middle floor, or
travel to a location on the middle floor associated with a holding area.

3. The system of claim 1, wherein:
the first robotic drive is configured to travel within a first lane on the top floor that primarily extends in a first direction in the sortation facility; and
the second robotic drive is configured to travel within a second lane on the middle floor that primarily extends in a second direction in the sortation facility, the second direction being different than the first direction.

4. A method comprising
transmitting, to a first device located on a third floor of an environment, a first instruction to travel to a first location on the third floor in which a package is to be received;
receiving an indication associated with the first device receiving the package;
transmitting, to a second device, a second instruction to travel to a second location on a second floor of the environment in which the second device is to receive the package from the first device;
transmitting, to the first device, a third instruction to travel to a third location on the third floor in which the package is to be transferred to the second device located on the second floor;
and
transmitting, to the second device, a fourth instruction to travel to a fourth location on the second floor in which the package is to be transferred to a container located on a first floor of the environment.

5. The method of claim 4, further comprising:
determining a shipping address of the package;
determining the container based at least in part on the shipping address;
determining the second location based at least in part on the container; and
determining the fourth location based at least in part on the container.

6. The method of claim 4, wherein:
at the third location, the first device is configured to transfer the package into a first chute for transferring the package to the second device;
at the second location, the second device is configured to receive the package from the first device via the first chute; and
at the fourth location, the second device is configured to transfer the package into a second chute for transferring the package to the container.

7. The method of claim 6, wherein:
the first chute is arranged in a first row with one or more first chutes;
the first chute aligns within the container along a first axis;
the second chute is arranged in a second row with one or more second chutes; and
the second chute aligns within the container along a second axis.

8. The method of claim 4, wherein the package comprises a first package, further comprising:

transmitting, to the first device, a fifth instruction to travel to the first location associated with receiving a second package; and transmitting, to the second device, a sixth instruction to travel to the second location or a fourth location associated with receiving a third package.

9. The method of claim 4, further comprising:

transmitting, to a third device located on the third floor, a fifth instruction to travel to a fifth location associated with receiving an additional package;

transmitting, to a fourth device, a sixth instruction to travel to a sixth location in which the fourth device is to receive the additional package from the third device;

transmitting, to the third device, a seventh instruction to travel to a seventh location in which the additional package is to be transferred to the fourth device located on the second floor; and transmitting, to the fourth device, a ninth instruction to travel to a fifth location in which the additional package is to be transferred to an additional container located on the first floor.

10. The method of claim 9, wherein:

the first device is configured to travel within a first lane on the third floor;

the second device is configured to travel within a second lane on the second floor;

the third device is configured to travel within a third lane on the third floor, the third lane being spaced apart in a first direction from the first lane; and the fourth device is configured to travel within a fourth lane on the second floor, the fourth lane being spaced apart in a second direction from the second lane.

11. The method of claim 10, wherein at least one of:

one or more additional first robotic drives are configured to travel within the first lane; or one or more additional second robotic drives are configured to travel within the second lane.

12. The method of claim 4, wherein:

the first device sorts the package in a first direction within the environment; and the second device sorts the package in a second direction within the environment, wherein the second direction is different than the first direction.

13. The method of claim 4, further comprising receiving, from at least one of the first device or the second device, an additional indication indicating that the package has been transferred from the first device to the second device.

14. The method of claim 4, wherein the package comprises a first package, further comprising transmitting, to a third device, a third instruction to travel to the third location to transfer a second package to the second device.

15. The method of claim 4, further comprising:

transmitting, to a third device located on the third floor, a fifth instruction to travel the first location associated with receiving an additional package;

transmitting, to a fourth device, a sixth instruction to travel to a fifth location in which the fourth device is to receive the additional package from the third device;

transmitting, to the third device, a seventh instruction to travel to a sixth location in which the additional package is to be transferred to the fourth device located on the second floor; and transmitting, to the fourth device, an eighth instruction to travel to a seventh location in which the additional package is to be transferred to an additional container located on the first floor, and wherein:

the first device and the third device are configured to travel within a first lane on the third floor that extends substantially in a first direction; and the second device and the fourth device are configured to travel within a second lane on the second floor that extends substantially in a second direction.

16. An environment comprising:

a third floor including:

one or more induct stations for sorting packages; and first robotic drives configured to maneuver about the third floor for sorting the packages;

a second floor positioned vertically beneath the third floor, the second floor including second robotic drives configured to receive the packages from one or more of the first robotic drives, the second robotic drives configured to maneuver about the second floor to sort the packages; and a first floor positioned vertically beneath the second floor, the first floor including containers for receiving the packages from the second robotic drives.

17. The environment of claim 16, further comprising:

first chutes that extend between the third floor and the second floor, the first chutes transferring the packages from the third floor to the second floor; and second chutes that extend between the second floor and the first floor, the second chutes transferring the packages from the second floor to the first floor.

18. The environment of claim 17, wherein:

the first chutes are arranged in first rows that are spaced apart in a first direction; and the second chutes are arranged in second rows that are spaced apart in a second direction.

19. The environment of claim 16, wherein:

the first robotic drives are configured to sort the packages in a first direction within the environment; and the second robotic drives are configured to sort the packages in a second direction within the environment.

20. The environment of claim 16, further comprising a logistic management system, wherein the logistic management system coordinates the first robotic drives and the second robotic drives for sorting the packages within the environment.

* * * * *